J. J. HUTCHINS.
Axle Skeins.

No. 153,569. Patented July 28, 1874.

WITNESSES:
E. Wolff
Sedgwick

INVENTOR:
J. J. Hutchins
BY
ATTORNEYS.

UNITED STATES PATENT OFFICE.

JEREMIAH J. HUTCHINS, OF RED OAK, IOWA.

IMPROVEMENT IN AXLE-SKEINS.

Specification forming part of Letters Patent No. 153,569, dated July 28, 1874; application filed May 9, 1874.

*To all whom it may concern:*

Be it known that I, JEREMIAH JOHNSON HUTCHINS, of Red Oak, Montgomery county, Iowa, have invented a new and Improved Thimble-Skein, of which the following is a specification:

My invention consists of a hollow cast-metal thimble-skein, having the hollow portion screw-threaded to screw onto the axle for attaching the skein thereto, the threads being made right and left for different sides of the wagon, in order to have the pitch so that the skeins will not work loose by friction of the wheels revolving on them when the wagon moves forward.

Figure 1:
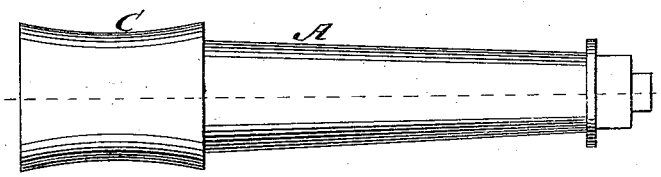
Figure 2:
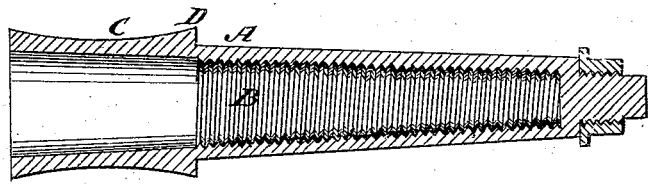

Figure 1 is a side elevation of a thimble-skein constructed according to my invention, and Fig. 2 is a longitudinal sectional elevation.

Similar letters of reference indicate corresponding parts.

A represents the cast-metal skein with a hollow space, B, extending nearly its whole length, and tapered to correspond with the exterior form of the skein, and screw-threaded in the hollow portion to screw onto the axle, which will be correspondingly shaped and threaded. C is an extension on the inner end of the skein for some distance beyond the collar D, for extending along the axle beyond the screw-threaded portion to strengthen it.

Having thus described my invention, I claim as new and desire to secure by Letters Patent—

1. The thimble-skein A having its hollow portion B screw-threaded for attachment to the axle, in the manner described.

2. The axle-skein A, having the extension C, the inner surface of which is formed on the same lines or taper as the screw-threaded portion B, as shown and described.

JEREMIAH JOHNSON HUTCHINS.

Witnesses:
 J. B. PACKARD,
 C. E. RICHARDS.